United States Patent [19]

Goebel

[11] 4,407,909

[45] Oct. 4, 1983

[54] METHOD FOR INTERNALLY DISCHARGING AN ELECTROCHEMICAL CELL

[75] Inventor: Franz Goebel, Sudbury, Mass.

[73] Assignee: GTE Products Corporation, Stamford, Conn.

[21] Appl. No.: 286,218

[22] Filed: Jul. 23, 1981

[51] Int. Cl.³ .................. H01M 10/44; H01M 14/00; H01M 6/00; H01M 6/20

[52] U.S. Cl. ..................................... 429/50; 429/48; 429/65; 429/7; 429/105

[58] Field of Search ..................... 429/50, 52, 7, 8, 48, 429/49, 65, 122, 105; 320/50, 51

[56] References Cited

U.S. PATENT DOCUMENTS

| | | | |
|---|---|---|---|
| 795,325 | 7/1905 | Winters | 429/122 |
| 3,213,345 | 10/1965 | Loftus | 320/51 |
| 3,471,766 | 10/1969 | Burant et al. | 320/51 |
| 3,901,729 | 8/1975 | Duddy | 429/50 |
| 4,055,709 | 10/1977 | Medford | 429/49 |
| 4,075,400 | 2/1978 | Fritts | 429/62 |
| 4,086,397 | 4/1978 | Goebel et al. | 429/105 |
| 4,127,707 | 11/1978 | Ohya et al. | 429/149 |
| 4,129,686 | 12/1978 | Kaduboski | 429/61 |
| 4,239,836 | 12/1980 | Picciolo | 429/65 |
| 4,252,869 | 2/1981 | Heitz et al. | 429/49 |
| 4,293,622 | 10/1981 | Marincic et al. | 429/50 |
| 4,298,663 | 11/1981 | Moses | 429/50 |

Primary Examiner—G. Ozaki
Assistant Examiner—Stephen J. Kalafut
Attorney, Agent, or Firm—David M. Keay; Peter Xiarhos

[57] ABSTRACT

A method for completing the discharge of a primary electrochemical cell in which the discharge has prematurely ceased or has significantly diminished. A primary electrochemical cell to which the method of the invention is applicable includes a plurality of anode and cathode structures arranged in alternation, and an electrolytic solution. Each of the anode structures and the electrolytic solution includes a component subject to consumption by chemical action within the cell during discharge. The anode and cathode structures are connected to external electrical terminals of the cell by way of metal tabs and metal bus bar assemblies. In the event of the occurrence of an open circuit break or other impairment of the internal electrical connections between the anode and cathode structures and the external electrical terminals resulting in a cessation or significant diminishing of the discharge of the cell, the discharge of the cell is completed by introducing a moderately electrically-conductive load shunt material, such as a carbon material, into the cell to bridge the internal electrical metal tabs and bus bar assemblies. The material is selected to be chemically inert with the internal components of the cell and operates to establish an internal electrical load shunt across the metal tabs and bus bar assemblies for permitting discharge of the cell until consumable components of the cell have been consumed by chemical reaction within the cell causing termination of chemical action within the cell.

15 Claims, 3 Drawing Figures

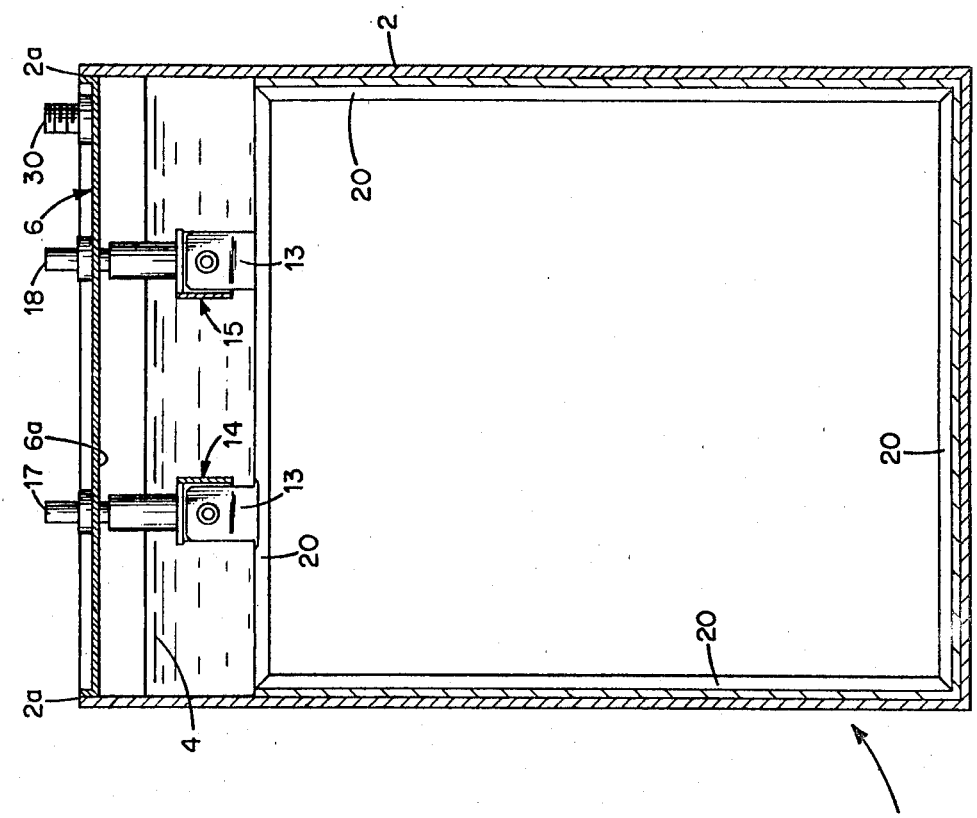
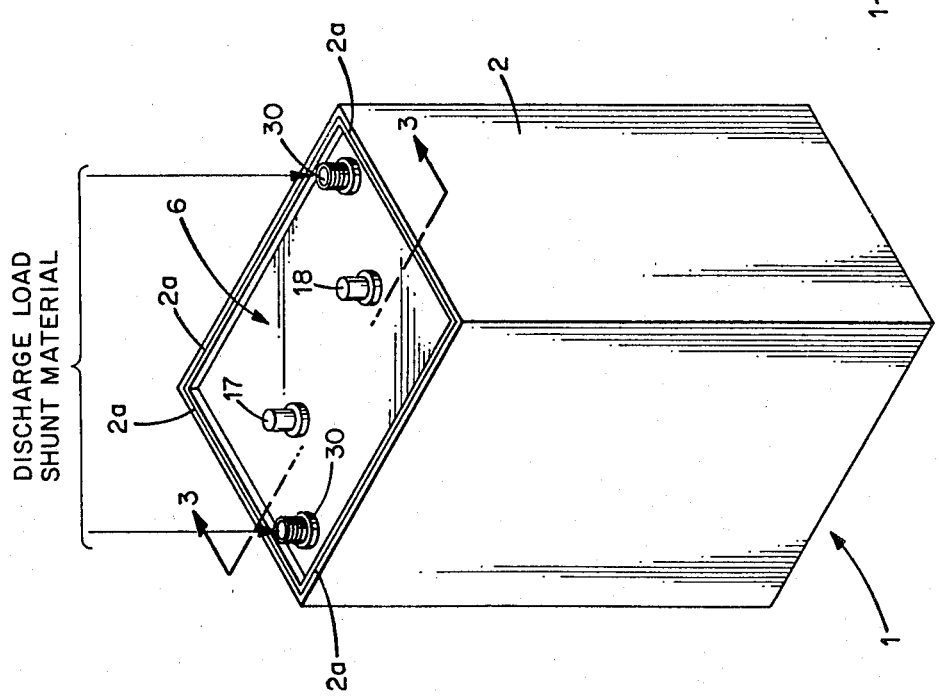

METHOD FOR INTERNALLY DISCHARGING AN ELECTROCHEMICAL CELL

The invention herein described was made in the course of a contract with the Department of the Air Force.

BACKGROUND OF THE INVENTION

The present invention relates to a method for discharging an electrochemical cell and, more particularly, to a method for internally discharging a primary electrochemical cell following the premature cessation or significant decline in the discharge of the cell due to a break or other impairment of internal electrical connections of the cell.

Primary electrochemical cells are commonly available in a large assortment of sizes and shapes. One type of primary electrochemical cell which has been particularly successful, especially for high-current drain, low-temperature applications, is a so-called prismatic cell. Such a cell is generally described in U.S. Pat. No. 4,086,397, in the names of Franz Goebel and Nikola Marincic, and includes a physically large battery stack enclosed together with an electrolytic solution within a large, generally-rectangular metal housing. The battery stack as used within the cell comprises a large number of generally-rectangular cell components including a plurality of anodes, carbon cathode current collector electrodes, and insulative separators between the anodes and the carbon cathode current collector electrodes. Each anode generally comprises a large rectangular sheet of an oxidizable alkali metal, such as lithium, physically impressed into a supporting (e.g., nickel) grid, and each of the carbon cathode current collector electrodes comprises an aggregation of porous, semi-rigid carbon globules or conglomerates physically impressed into a metal (e.g., nickel) current collector grid. Each of the anodes and carbon cathode current collector electrodes further has a narrow rail around the periphery thereof and a tab connected to the rail for facilitating the physical and electrical connection of the associated electrode to a corresponding terminal assembly. A common and preferred electrolytic solution employed in the cell as described above is a cathodelectrolyte solution comprising a reducible soluble cathode such as thionyl chloride and an electrolyte solute such as lithium tetrachloroaluminate dissolved in the thionyl chloride.

By the appropriate selection of the battery cell components, a cell as described above can be constructed to have any one of several possible sizes and energy configurations. A typical cell, for example, has exterior dimensions of approximately 18 inches (height)×13 inches (width)×10 inches (depth), a weight of 156 pounds, an ampere-hour capacity rating of 10,000 ampere-hours, and a nominal discharge current of 40 amperes.

During the normal discharge of the cell as described hereinabove, current is drawn from the cell by way of its externally-located terminals, or posts, and supplied to a load coupled to the terminals. It is normally expected that the cell will be useful in supplying current to the load until the cell has become fully discharged, a condition which occurs when one or more active components of the electrochemical system of the cell has been fully consumed by chemical reaction within the cell during discharge. However, in the event the external electrical circuit of the cell is interrupted or otherwise impaired for any reason during discharge of the cell, such as an open circuiting of one or more of the internal electrical connections between cell terminals and the anodes and/or carbon cathode current collector electrodes, the discharge of the cell prematurely discontinues or the discharge is significantly diminished. In such a situation, and especially where a high amount of energy may still remain in the cell, it is highly desirable that the discharge of the cell be completed in some safe and expeditious fashion so as to facilitate the ultimate disposal of the cell. Since, as indicated above, the cell can no longer be effectively discharged by way of the cell terminals, clearly some other solution is required.

BRIEF SUMMARY OF THE INVENTION

In accordance with the present invention, a method is provided for completing the discharge of an electrochemical cell in which the discharge has prematurely ceased or has significantly diminished as a result of which chemically consumable components of the cell remain to be consumed. The electrochemical cell to which the method of the invention is applicable includes at least one anode structure, at least one cathode structure, and an electrolytic solution. One or more of the aforesaid components is subject to consumption during discharge of the cell.

The cell further includes a pair of external electrical terminals adapted to be coupled to an external load during discharge and internal electrical metal terminal connections between the anode and cathode structures and the external electrical terminals for making electrical connections between the anode and cathode structures and the associated external terminals. The method of the invention is utilized in the event of an open circuit break or other impairment of the electrical connections between the anode and/or cathode structures and associated external terminals causing a cessation or significant diminishing of the discharge of the cell. The method of the invention includes the step of introducing an electrically-conductive load shunt material into the cell to bridge the internal electrical metal terminal connections. The material is selected to be chemically inert with the internal components of the cell and is operative to establish an internal electrical load shunt across the internal electrical metal terminal connections for permitting discharge of the cell until consumable components of the cell have been consumed by chemical reaction within the cell causing termination of chemical action within the cell.

BRIEF DESCRIPTION OF THE DRAWING

Various objects, features and advantages of a method for internally discharging an electrochemical cell in accordance with the present invention will be apparent from a detailed discussion taken in conjunction with the accompanying drawing in which:

FIG. 1 is a perspective view of a primary electrochemical cell of a type which may be internally discharged in accordance with the method of the present invention;

FIG. 3 is a cross-sectional view of the electrochemical cell of FIG. 1, taken along the line 3—3 in FIG. 1.

DETAILED DESCRIPTION OF THE INVENTION

Figure 2:
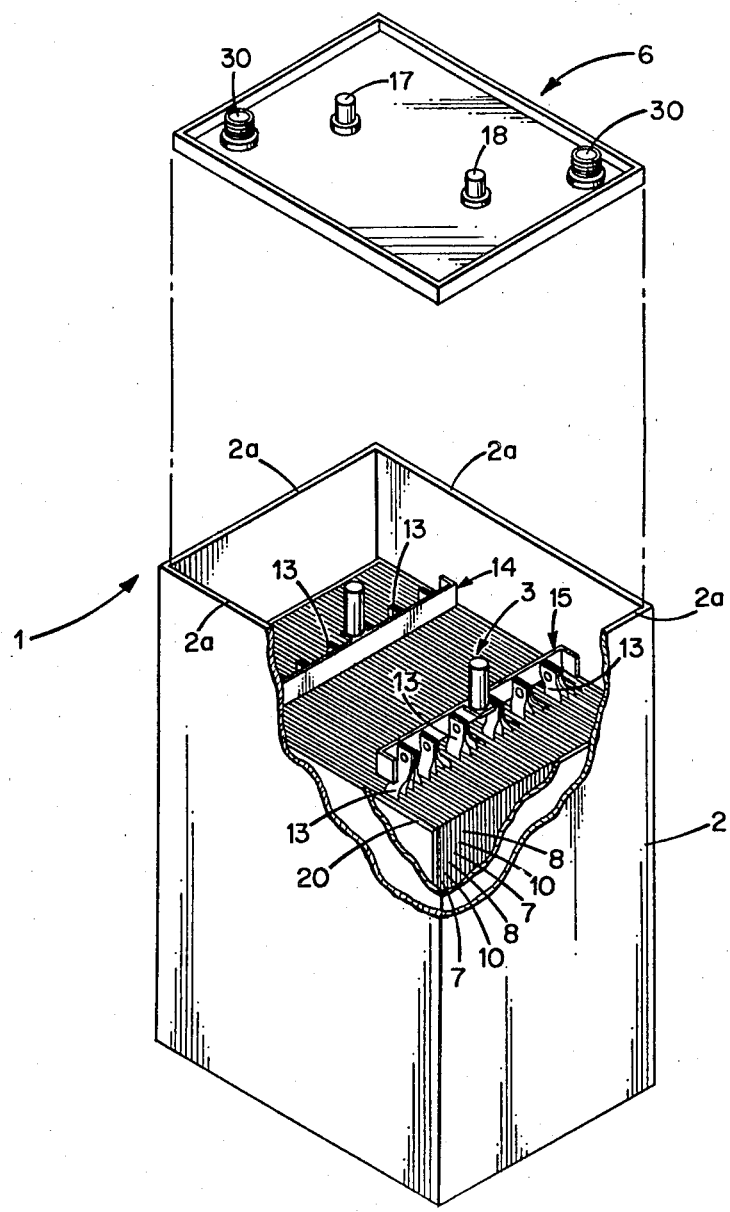
FIG. 2 is an exploded perspective view, partly broken away, illustrating various components of the electrochemical cell of FIG. 1.

Referring now to FIGS. 1-3, there is shown a primary electrochemical cell 1 of a type which may be internally discharged in accordance with the method of the present invention. As shown in FIGS. 1-3, the electrochemical cell generally comprises a rectangular housing 2, a battery stack 3 disposed within the housing 2, an electrolytic solution 4 (FIG. 3) in contact with the battery stack 3, and a top cover assembly 6. The housing 2 may be of stainless steel and have typical outer dimensions of approximately 18 inches (height)×13 inches (width)×10 inches (depth). The battery stack 3 as employed within the housing 2 comprises a large number of generally-rectangular cell components. These components include a plurality of anodes 7, carbon cathode current collector electrodes 8, and insulative separators 10 between the anodes 7 and the carbon cathode current collector electrodes 8. Although not specifically shown in the drawing, in a preferred form and construction of the battery stack 3, each of the anodes 7 comprises a large rectangular sheet of an oxidizable alkali metal, such as lithium, pressed into a supporting metal (e.g., nickel) grid, and each of the carbon cathode current collector electrodes 8 comprises an aggregation of porous semi-rigid carbon globules or conglomerates pressed into a metal (e.g., nickel) grid to be supported thereby. The grids of the electrodes 8 also serve as current collector members for the cell during the discharge of the cell 1. The separators 10, which serve to electrically isolate the anodes 7 from the carbon cathode current collector electrodes 8, may be of a suitable insulative material such as fiberglass. The anodes 7 and the carbon cathode current collector electrodes 8 as described hereinabove further have narrow portions or rails at the peripheries thereof from which tabs 13 extend for facilitating the physical and electrical connection of the anodes 7 and the carbon cathode current collector electrodes 8 to corresponding metal (e.g., nickel) bus bar assemblies 14 and 15, respectively. The assemblies 14 and 15 are in turn physically and electrically connected to a pair of metal (e.g., nickel) terminals or posts 17 and 18, respectively, located in, and insulated from, the top cover assembly 6. The peripheral metal portions are further covered by insulator members 20, as indicated in FIGS. 2 and 3, which may take the form of channels of U-shaped cross-section. The channels 20 are used for electrically isolating the components of the battery stack 3 from each other. Typical dimensions for the battery stack 3 as described hereinabove, corresponding to a total of 47 anodes and cathode electrodes, are approximately 14.5 inches (height)×12.8 inches (width)×9.8 inches (depth). The electrolytic solution 4 to which the battery stack 3 is exposed and which is compatible with the cell components as described hereinabove is preferably a cathodelectrolyte solution comprising a reducible soluble cathode such as thionyl chloride and an electrolyte solute such as lithium tetrachloroaluminate dissolved in the thionyl chloride.

With the battery stack 3 disposed within the housing 2, the assembly of the cell 1 is completed by securing the top cover assembly 6 to the housing 2. This step is accomplished by simply clamping the top cover assembly 6 to the housing 2 by suitable apparatus (not shown) so that the cover assembly 6 abuts against the four walls of the housing 2, and then welding the top cover assembly 6 to the housing 2 at exposed top edges or surfaces 2a. The electrolytic solution 4 is introduced into the cell 1 by way of standard ports 30 located in the top cover asssembly 6.

As will be described in detail hereinafter, the ports 30 may also be used for introducing a discharge load shunt material into the cell 1 for completing the discharge of the cell in the event the discharge has been prematurely terminated or significantly diminished.

The eletrochemical cell 1 as described hereinabove, when employed during its discharge mode of operation, provides current by way of its terminals 17 and 18 to a suitable load (not shown) coupled to the terminals 17 and 18. It is normally expected that the cell 1 will be useful in supplying current to the load until the cell has become fully discharged, a condition which occurs when one or more of the active components of the cell 1, such as the lithium and the thionyl chloride, have been fully used up or consumed by chemical reaction within the cell during discharge. In actual practice, however, it is possible for the cell to be subjected to certain conditions (e.g., physical damage) causing an open circuit condition to develop within the cell, for example, between one or more of the anodes 7 and/or the cathode electrodes 8 and the respective bus bar assemblies 14 and 15. This open circuit condition results in a breaking or other impairment of the electrical circuit to the load. In such a case, the discharge of the cell prematurely ceases or is significantly diminished and current can no longer be drawn effectively by way of the cell terminals 17 and 18 and supplied to the load. In the event a substantial amount of energy remains in the cell at the time of the breaking of the external electrical circuit, it is normally desirable that the cell be completely inactivated so as to facilitate disposal of the cell in a safe and efficient manner. To inactivate the cell it therefore becomes necessary to complete the discharge of the cell.

In accordance with the present invention it has been discovered that the discharge of a cell in which the discharge has been prematurely terminated or significantly diminished can be re-initiated and completed by internal means as opposed to external means. Specifically, it has been discovered that a material, termed a "discharge load shunt material", may be introduced into the incompletely-discharged cell, for example, by way of the ports 30 as shown in the drawing, so as to bridge the metal terminal components within the cell, including the tabs 13 and bus bar assemblies 14 and 15, and cause a mild short circuit condition or shunt to be established between these components. As a result, discharge of the cell is re-initiated and continues until either or both of the active consumable components of the cell, that is, the lithium and/or the thionyl chloride, has been completely used up. At that time, cell activity ceases completely. The above-mentioned introduction of the discharge load shunt material into the cell may be by way of gravity or compression feed.

To insure proper discharge of the cell as described above, it is necessary that the discharge load shunt material be moderately electrically conductive, of reasonably high resistivity (e.g., between 1000 ohms and 0.1 ohm) and be chemically inert, that is, that it not react chemically with the various components and ingredients used within the cell. In addition, and for primarily safety reasons, it is preferred that the discharge load shunt material introduced into the cell establish the mild short circuit condition or shunt between the internal metal terminal components so that the re-initiated discharge occurs at a slower rate than the original rated discharge rate (e.g., 1 ma/cm² of geometrical electrode surface area), even though it may require weeks and possibly months to completely discharge the cell.

A variety of chemically inert, electrically conductive, high resistivity discharge load shunt materials may be used for the above purpose. Examples of suitable discharge load shunt materials include carbon materials in forms such as Shawinigan black and graphite, and mixtures thereof. The carbon materials may assume a variety of physical forms such as powder, flakes, fibres, granular, etc. The carbon materials may be admixed with metal powders or particles, for example, of copper, nickel or stainless steel. The carbon materials (or mixtures) may be used dry or with chemically stable, inert liquid carriers such as mineral oil and/or paraffin oil. The existing thionyl chloride in the cell may also be used as a liquid carrier. The discharge load shunt material, whatever its form and whether used dry or with a liquid carrier, is introduced into the cell in amount sufficient to bridge the tabs 13 and bus bar assemblies 14 and 15 so that a mild short circuit or shunt conditions is established between these parts thereby to permit completion of the discharge of the cell.

While there has been described what is considered to be a preferred embodiment of the invention, various changes and modifications therein will be apparent to those skilled in the art without departing from the invention as called for in the appended claims.

What is claimed is:

1. A method for completing the discharge of an electrochemical cell in which the discharge has prematurely ceased or has significantly diminished as a result of which chemically consumable components of the cell remain to be consumed, said electrochemical cell including at least one anode structure, at least one cathode structure, and an eletrolytic solution disposed within a housing, one or more of the aforesaid components being subject to consumption during discharge of the cell, said cell further including a pair of electrical terminals extending external of the housing adapted to be coupled to an external load during discharge, and electrical metal terminal connections internal of the housing between the anode and cathode structures and the electrical terminals for making electrical connections between the anode and cathode structures and the associated terminals, said method being utilized in the event of an open circuit break or other impairment of the electrical connections between the anode and/or cathode structures and associated terminals causing a cessation or significant diminishing of the discharge of the cell, said method comprising the step of:

introducing an electrically-conductive load shunt material into the cell internal of the housing to bridge the electrical metal terminal connections internal of the housing, said material being selected to be chemically inert with the internal components of the cell and being operative to establish an electrical load shunt internal of the housing across the electrical metal terminal connections internal of the housing for permitting discharge of the cell until consumable components of the cell have been consumed by chemical reaction within the cell causing termination of chemical action within the cell; wherein the electrically-conductive load shunt material is selected to permit discharge of the cell to take place at a rate below the original rated discharge rate of the cell.

2. A method in accordance with claim 1 wherein: the load shunt material includes a carbon material.

3. A method in accordance with claim 2 wherein: the load shunt material further includes a liquid carrier for the carbon material.

4. A method in accordance with claim 2 wherein: the load shunt material further includes metal particulants admixed with the carbon material.

5. A method in accordance with claim 2 wherein: the carbon material is selected from a group consisting of carbon black, graphite and mixtures thereof.

6. A method in accordance with claim 1 wherein: the electrochemical cell is a primary electrochemical cell having an anode structure including an oxidizable alkali metal, a cathode structure including a porous carbon material, and an electrolytic solution including a reducible soluble cathode and an electrolyte solute dissolved in the soluble cathode.

7. A method in accordance with claim 6 wherein: the oxidizable alkali metal of the anode structure is lithium; the reducible soluble cathode of the electrolyte solution is thionyl chloride; and the electrolyte solute of the electrolytic solution is lithium tetrachloroaluminate; said lithium metal and thionyl chloride being consumable by chemical action during discharge of the cell.

8. A method in accordance with claim 7 wherein: the load shunt material includes a carbon material.

9. A method in accordance with claim 8 wherein: the carbon material is selected from a group consisting of carbon black, graphite and mixtures thereof.

10. A method for completing the discharge of a primary electrochemical cell in which the discharge has prematurely diminished as a result of which chemically consumable components of the cell remain to be consumed, said electrochemical cell including a plurality of anode and cathode structures arranged in alternation and each having a metal tab extending therefrom, and an electrolytic solution disposed within a housing, each of the anode structures and the electrolytic solution including a component subject to consumption during discharge of the cell, said cell further including a pair of electrical terminals extending external of the housing adapted to be coupled to an external load during discharge, and first and second metal bus bar assemblies internal of the housing connected in common to the tabs extending from the anode and cathode structures, respectively, for making electrical connections between the anode and cathode structure and the associated terminals, said method being utilized in the event of an open circuit break or other impairment of the electrical connections between the anode and/or cathode structures and associated terminals causing a cessation or significant diminishing of the discharge of the cell, said method comprising the step of:

introducing an electrically-conductive load shunt material into the cell internal of the housing to bridge the metal tabs and bus bar assemblies connected to the anode and cathode structures, said material being selected to the chemically inert with the internal components of the cell and being operative to establish an electrical load shunt internal of the housing across the metal tabs and bus bar assemblies for permitting discharge of the cell until the consumable components of the cell have been consumed by chemical reaction within the cell causing termination of chemical action within the cell; wherein the electrically-conductive load shunt material is selected to permit discharge of the cell to take place at a rate lower than the original rated discharge rate of the cell.

11. A method in accordance with claim 10 wherein: the load shunt material includes a carbon material.

12. A method in accordance with claim 11 wherein: the load shunt material further includes a liquid carrier for the carbon material.

13. A method in accordance with claim 11 wherein: the carbon material is selected from a group consisting of carbon black, graphite and mixtures thereof.

14. A method in accordance with claim 13 wherein: each of the anode structures includes an oxidizable alkali metal;
each of the cathode structures includes a porous carbon material; and
the electrolytic solution includes a reducible soluble cathode and an electrolyte solute dissolved in the soluble cathode.

15. A method in accordance with claim 14 wherein: the oxidizable alkali metal of each anode structure is lithium;
the reducible soluble cathode of the electrolytic solution is thionyl chloride; and
the electrolyte solute of the electrolytic solution is lithium tetrachloroaluminate;
said lithium metal and thionyl chloride being consumable by chemical action during discharge of the cell.

* * * * *